( 12 ) United States Patent
Conley et al.

(10) Patent No.: US 8,042,252 B2
(45) Date of Patent: Oct. 25, 2011

(54) PIPE COUPLING AND METHOD FOR INSTALLATION

(75) Inventors: Jeffrey Ryan Conley, Calgary (CA); Samuel Glen Bouey, Calgary (CA)

(73) Assignee: Flexpipe Systems Inc., Calgary (CA)

( * ) Notice: Subject to any disclaimer, the term of this patent is extended or adjusted under 35 U.S.C. 154(b) by 0 days.

(21) Appl. No.: 12/636,500

(22) Filed: Dec. 11, 2009

(65) Prior Publication Data

US 2010/0115758 A1    May 13, 2010

Related U.S. Application Data

(62) Division of application No. 11/539,575, filed on Oct. 6, 2006, now Pat. No. 7,946,629.

(60) Provisional application No. 60/596,643, filed on Oct. 7, 2005, provisional application No. 60/766,548, filed on Jan. 26, 2006.

(51) Int. Cl.
*B21D 39/00* (2006.01)
*B23P 11/00* (2006.01)
*F16L 33/00* (2006.01)

(52) U.S. Cl. ............. 29/516; 29/505; 29/506; 29/508; 29/515

(58) Field of Classification Search .......... 285/256, 285/242; 29/505, 506, 508, 514, 515, 516, 29/469.5
See application file for complete search history.

(56) References Cited

U.S. PATENT DOCUMENTS

| 1,786,489 | A | * | 12/1930 | Hopkins | 285/256 |
|---|---|---|---|---|---|
| 2,073,909 | A | * | 3/1937 | Stecher | 29/508 |
| 2,086,703 | A | | 7/1937 | Eastman | |
| 2,314,001 | A | | 3/1943 | Lusher et al. | |
| 2,314,002 | A | | 3/1943 | Lusher et al. | |
| 2,401,921 | A | | 6/1946 | Fisher et al. | |
| 2,797,111 | A | | 6/1957 | Beazley | |
| 2,920,910 | A | | 1/1960 | Schnabel | |
| 3,210,100 | A | | 10/1965 | Lowles et al. | |
| 3,924,883 | A | | 12/1975 | Frank | |
| 4,006,524 | A | | 2/1977 | Frank | |
| 4,111,469 | A | | 9/1978 | Kavick | |
| 4,114,656 | A | | 9/1978 | Kish | |
| 4,349,049 | A | | 9/1982 | Silvey | |
| 4,353,581 | A | | 10/1982 | Eisenzimmer | |
| 4,381,594 | A | | 5/1983 | Levande et al. | |
| 4,498,691 | A | | 2/1985 | Cooke | |
| 4,548,430 | A | | 10/1985 | Haubert et al. | |
| 4,589,688 | A | | 5/1986 | Johnson | |

(Continued)

FOREIGN PATENT DOCUMENTS

JP             01127124 A    *    5/1989

*Primary Examiner* — Essama Omgba
(74) *Attorney, Agent, or Firm* — Bennett Jones LLP

(57) ABSTRACT

The coupling includes a mandrel and a coupling outer sleeve. In a method for installing the coupling on a pipe, the mandrel is inserted into the inner diameter of an end of pipe with an outboard end of the mandrel protruding from an end of the pipe. Then the outer sleeve is positioned over the pipe to form a length of substantially concentrically arranged, overlapping parts of the mandrel, the pipe and the sleeve. Then the sleeve is crimped over at least a portion of length, which engages the pipe between the sleeve and the mandrel. Either before or after sleeve is crimped over the pipe, the sleeve is connected to the outboard end of the mandrel.

16 Claims, 3 Drawing Sheets

U.S. PATENT DOCUMENTS

| | | |
|---|---|---|
| 4,653,779 A | 3/1987 | Foster |
| 4,680,613 A | 7/1987 | Daniels et al. |
| 4,804,212 A | 2/1989 | Vyse |
| 4,858,967 A | 8/1989 | Tremoulet, Jr. et al. |
| 5,024,419 A | 6/1991 | Mulvey |
| 5,037,142 A | 8/1991 | Helping |
| 5,065,224 A | 11/1991 | Fraser et al. |
| 5,137,309 A | 8/1992 | Beagle |
| 5,173,621 A | 12/1992 | Fraser et al. |
| 5,199,751 A * | 4/1993 | Beagle et al. ............. 285/256 |
| 5,267,758 A | 12/1993 | Shah et al. |
| 5,288,112 A | 2/1994 | Shiery |
| 5,317,799 A * | 6/1994 | Chapman et al. ............ 29/508 |
| 5,387,016 A | 2/1995 | Joseph et al. |
| 5,406,688 A * | 4/1995 | Hayashi ..................... 29/505 |
| 5,601,317 A | 2/1997 | Crouse et al. |
| 5,722,150 A | 3/1998 | Swanson, III |
| 5,961,157 A | 10/1999 | Baron et al. |
| 6,099,045 A | 8/2000 | Pirona |
| 6,283,206 B1 | 9/2001 | Fraser et al. |
| 6,345,431 B1 * | 2/2002 | Greig ......................... 29/506 |
| 6,363,974 B1 | 4/2002 | Perez et al. |
| 6,394,506 B1 | 5/2002 | Street |
| 6,446,672 B1 | 9/2002 | Kalman et al. |
| 6,460,897 B1 | 10/2002 | Manuli |
| 6,619,698 B2 | 9/2003 | Juedes |
| 6,705,351 B2 | 3/2004 | Fraser |
| 6,769,454 B2 | 8/2004 | Fraser et al. |
| 6,827,375 B2 | 12/2004 | Fraser |
| 6,889,715 B2 | 5/2005 | Fraser et al. |
| 6,899,140 B2 | 5/2005 | Fraser et al. |
| 7,004,510 B2 | 2/2006 | Treichel |
| 7,014,218 B2 | 3/2006 | Fisher et al. |
| 7,021,673 B2 | 4/2006 | Furuta et al. |
| 7,062,834 B2 * | 6/2006 | Patterson et al. ............ 29/505 |
| 7,380,837 B2 * | 6/2008 | Fullbeck et al. ............ 285/256 |
| 7,384,074 B2 | 6/2008 | He |
| 7,624,504 B2 * | 12/2009 | Watanabe ................ 29/890.144 |
| 7,661,720 B2 * | 2/2010 | Nakano et al. ................ 285/242 |
| 7,661,721 B2 * | 2/2010 | Mittersteiner et al. ........ 285/243 |
| 7,946,629 B2 * | 5/2011 | Conley et al. ................ 285/242 |
| 2002/0024218 A1 | 2/2002 | Manuli |
| 2002/0144745 A1 | 10/2002 | Fraser et al. |
| 2003/0056845 A1 | 3/2003 | Fraser et al. |
| 2003/0079791 A1 | 5/2003 | Wilson |
| 2003/0111839 A1 | 6/2003 | Fraser |
| 2003/0183293 A1 | 10/2003 | Fraser |
| 2003/0205898 A1 | 11/2003 | Baldwin et al. |
| 2004/0025953 A1 | 2/2004 | Fraser et al. |
| 2004/0036280 A1 | 2/2004 | Belcher |
| 2004/0051303 A1 | 3/2004 | Lorenz |
| 2004/0089970 A1 | 5/2004 | Fraser et al. |
| 2004/0090065 A1 | 5/2004 | Furuta et al. |
| 2004/0099324 A1 | 5/2004 | Fraser et al. |
| 2004/0112452 A1 | 6/2004 | Tan |
| 2004/0145182 A1 | 7/2004 | Smith et al. |
| 2004/0219317 A1 | 11/2004 | Belcher |
| 2004/0245774 A1 | 12/2004 | Eccleston |
| 2004/0251683 A1 | 12/2004 | Fisher et al. |
| 2005/0011572 A1 | 1/2005 | Belcher |
| 2005/0115622 A1 | 6/2005 | Bennett et al. |
| 2005/0161102 A1 | 7/2005 | Tan |
| 2006/0028020 A1 | 2/2006 | Fullbeck et al. |
| 2006/0071469 A1 | 4/2006 | Romanelli et al. |
| 2006/0071470 A1 | 4/2006 | Meyer et al. |
| 2006/0192380 A1 | 8/2006 | Fullbeck et al. |
| 2007/0222212 A1 | 9/2007 | Chisnell |
| 2008/0136176 A1 | 6/2008 | Katayama et al. |
| 2008/0185840 A1 | 8/2008 | Menor |
| 2009/0042457 A1 * | 2/2009 | Normoyle et al. ........... 439/877 |
| 2010/0194100 A1 * | 8/2010 | Koch ........................... 285/256 |

* cited by examiner

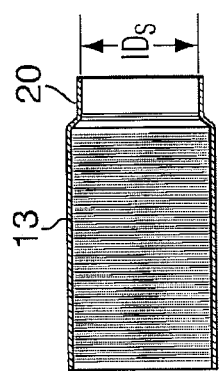
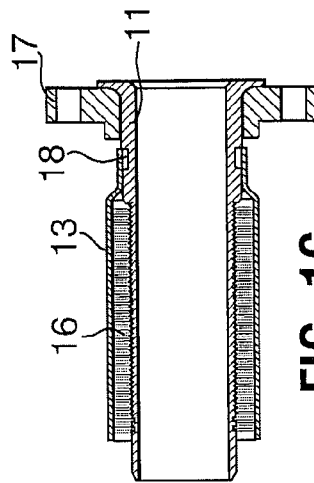
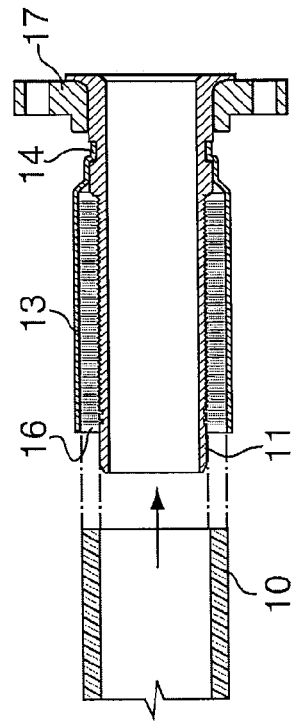
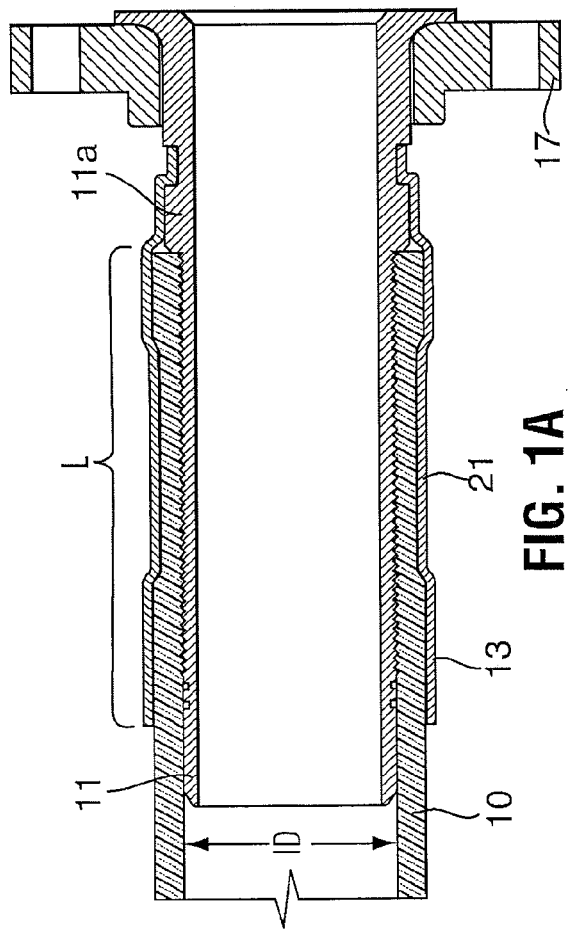
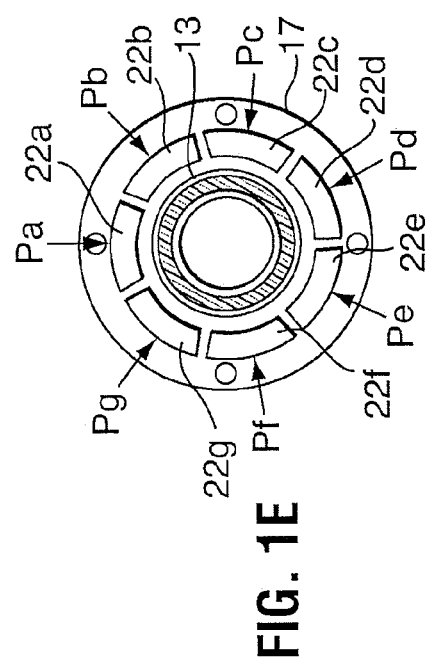

PIPE COUPLING AND METHOD FOR INSTALLATION

CROSS REFERENCE TO RELATED APPLICATIONS

This is a divisional application of U.S. application Ser. No. 11/539,575 filed Oct. 6, 2006, which is presently pending. U.S. application Ser. No. 11/539,575 and the present application claim priority under 35 U.S.C. §119(e) to U.S. provisional patent application No. 60/596,643 filed Oct. 7, 2005 and to U.S. provisional patent application No. 60/766,548 filed Jan. 26, 2006.

FIELD

The present invention relates generally to the field of composite pipes, and in particular to a coupling for use with composite pipe and a method of installing a coupling onto composite pipe.

BACKGROUND

Composite pipe, which for example is sometimes also referred to as fiber-reinforced plastic pipe or composite tubing, is well known in the art. These types of pipe are generally made of an internal layer of a polymeric material, outer layers of reinforcing fibers and polymeric coatings. Composite pipe is particularly useful for conducting fluids in oil and gas gathering and piping operations, as it can be flexible and therefore spoolable, resulting in faster and more cost-effective installation than pipe strings which are assembled from sections of metallic pipe threaded together.

In oil and gas gathering and piping operations, the composite pipe may be exposed to aggressive chemicals and harsh conditions. With regard to the conditions that the pipe may be exposed to, the load on the pipe, resulting from external pressure, internal pressure and tension or compression forces can be very high. The composite pipe must be able to withstand these conditions.

Composite pipe is often used in a manner that requires coupling and uncoupling of the pipe at selected locations. A coupling for use with composite pipe must ensure that the coupled end of the pipe has at least the same structural integrity as the rest of the pipe. The installed coupling should equal or exceed the full design ratings of the pipe and in particular the maximum load to which the pipe will be exposed under normal operating conditions.

SUMMARY

In accordance with a broad aspect of the invention, there is provided a method for installing a pipe coupling on a pipe comprising: providing a pipe coupling including a mandrel and an outer sleeve; inserting the mandrel into the pipe inner diameter of an end of the pipe with an outboard end of the mandrel protruding from the end of the pipe; positioning the outer sleeve substantially concentrically outwardly of pipe in which the mandrel is inserted to form a length of substantially concentrically arranged, overlapping portions of the mandrel, the pipe and the sleeve; crimping over at least a portion of the length to engage the pipe between the sleeve and the mandrel; and, either before or after crimping, connecting the sleeve to the outboard end of the mandrel.

In accordance with another broad aspect of the invention, there is provided a pipe coupling comprising: a mandrel including an axial passage and an outer surface, a sleeve including an inner bore with first and second open ends, the sleeve formed to be connectable adjacent the first open end substantially concentrically about the mandrel with an outboard end of the mandrel extending beyond the first open end of the sleeve and an annular space formed between the sleeve and the mandrel; and an opening adjacent the second open end positioned to be in communication with the annular space when the sleeve is connected concentrically about the mandrel.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIG. 1A is an axial sectional view of one embodiment of a pipe coupling according to the present invention installed on a pipe.

FIGS. 1B, 1C, 1D and 1E show progressive sectional views of a method for installing an end coupling to arrive at the end coupling of FIG. 1A.

DESCRIPTION OF VARIOUS EMBODIMENTS

Figure 2A:
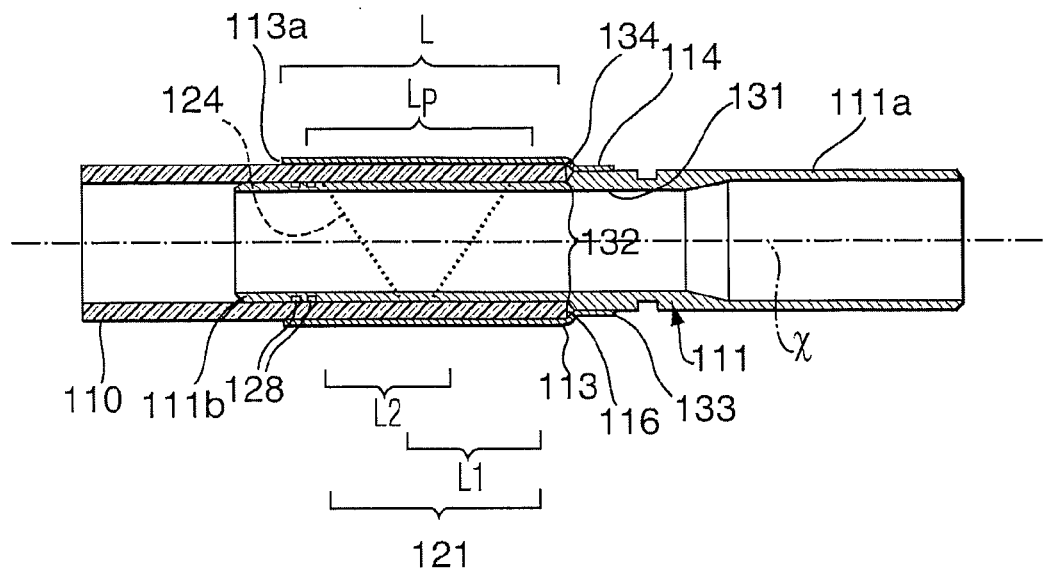
FIG. 2A is an axial sectional view of another embodiment of a pipe coupling according to the present invention installed on a pipe.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

A coupling according to one aspect of the invention is shown in FIG. 1A installed on a pipe 10. The coupling includes a mandrel 11 and a coupling outer sleeve 13. In a method for installing the coupling on a pipe, mandrel 11 is inserted into the inner diameter ID of an end of pipe 10 with an outboard end 11a of mandrel protruding from an end of the pipe. Then the outer sleeve 13 is positioned over the pipe to form a length L of substantially concentrically arranged, overlapping parts of mandrel 11, pipe 10 and sleeve 13. Then sleeve 13 is crimped over at least a portion of length L that engages the pipe between the sleeve and the mandrel. Either before or after sleeve 13 is crimped over the pipe, the sleeve is connected to outboard end 11*a* of mandrel 11.

An embodiment of a method for installing an end coupling on a pipe is shown in FIGS. 1B to 1E to arrive at a connection, for example, such as is shown in FIG. 1A. According to one embodiment of a method, coupling outer sleeve 13 may be connected to mandrel 11 so that the sleeve is not able to move axially over the mandrel. The connection 14 so formed may also serve to limit the rotational movement of the sleeve relative to the mandrel, although this may not always be necessary. Through the connection, sleeve 13 is positioned substantially concentrically about mandrel 11 creating an annular space 16 therebetween. As shown in FIG. 1D, an end of pipe 10 can be inserted into annular space 16 between the sleeve and the mandrel, which includes forcing the pipe over the mandrel. Once the pipe is in position over the mandrel, sleeve 13 may be crimped over the pipe to engage the pipe between the sleeve and the mandrel.

It is noted that although the illustrated method secures the sleeve to the mandrel prior to inserting the mandrel into the pipe ID, it is to be understood that these steps may be reversed if desired. Of course, if sleeve 13 is not connected to the mandrel before the pipe is forced over the mandrel and the mandrel includes an outboard enlargement, such as flange 17, that is larger than the inner bore of the sleeve, then the sleeve must be inserted over the end of the pipe prior to the mandrel being inserted into the pipe.

It is further noted that the actual method of securing the coupling outer sleeve over the mandrel is not of great importance. However, one way to rigidly attach the sleeve to the mandrel against axial movement thereover is to crimp/form the sleeve onto the mandrel, as shown in FIGS. 1. In order to facilitate a crimped connection between the mandrel and the sleeve, mandrel 11 may have grooves 18, such as annular indented grooves, as shown, grooves formed between ribs, teeth, etc., to engage the crimped material of sleeve 13. The depth of a groove may be greater than the thickness of the sleeve material, if desired. The crimping process may be accomplished in one or more steps, as desired. In one embodiment, a first crimping step (FIG. 1B) is used to create a crimped interval 20 of reduced inner diameter IDs on sleeve 13, before the sleeve is positioned over the mandrel (FIG. 1C). Then sleeve 13 is formed along its already crimped interval 20 to drive the sleeve 13 into engagement with the mandrel (FIG. 1D). Such a two step crimping process can allow a selection of crimping die size during the step of crimping to the mandrel that is more suitable for the diameter to be crimped. It will be appreciated, however, that such a two step process is not the only way to achieve a crimped connection between sleeve 13 and mandrel 11.

The sleeve may be crimped onto the pipe to form a crimped interval 21 therebetween through the application of pressure by a circular array of crimping dies 22*a*-22*g* (FIG. 1E) as driven by a force generating crimping assembly, which may use for example hydraulics. Although seven dies are shown, various numbers of dies may be used to crimp the sleeve around its circumference. In the step of crimping the sleeve over the pipe, it is desirable to use a crimping process that controls and seeks to equalize applied crimping pressure, arrows Pa-Pg, about the crimping circumference, rather than seeking equal displacement of crimping dies 22*a*-22*g*. As such, the pressures Pa, Pb, Pc, Pd, Pe, Pf and Pg may all be substantially equal. In one embodiment, the pressure applied at each die is generally +/−2 to 10% of a selected crimp pressure for the connection. In such a process for example, the dies may be formed to be substantially of equal surface area and the force applied to each die may generated through its own hydraulic cylinder, that is monitored and controlled such that the various cylinders apply a force to their die which is substantially uniform for the complete array of dies. It is noted that in such a process the displacement of the each die in the array may not be substantially equal to the displacement of the other dies of the array. Such a process may be useful achieve a substantially consistent annular engagement between the sleeve, the pipe and the mandrel even if the pipe or the sleeve has a non-uniform wall thickness or a non-uniform concentricity. It will be appreciated that the crimp pressure selected for any connection depends on the materials of the sleeve and the pipe in that connection.

Crimped interval 21 is positioned along length L of the overlapping sleeve 13, pipe 10 and mandrel 11.

Figure 2B:
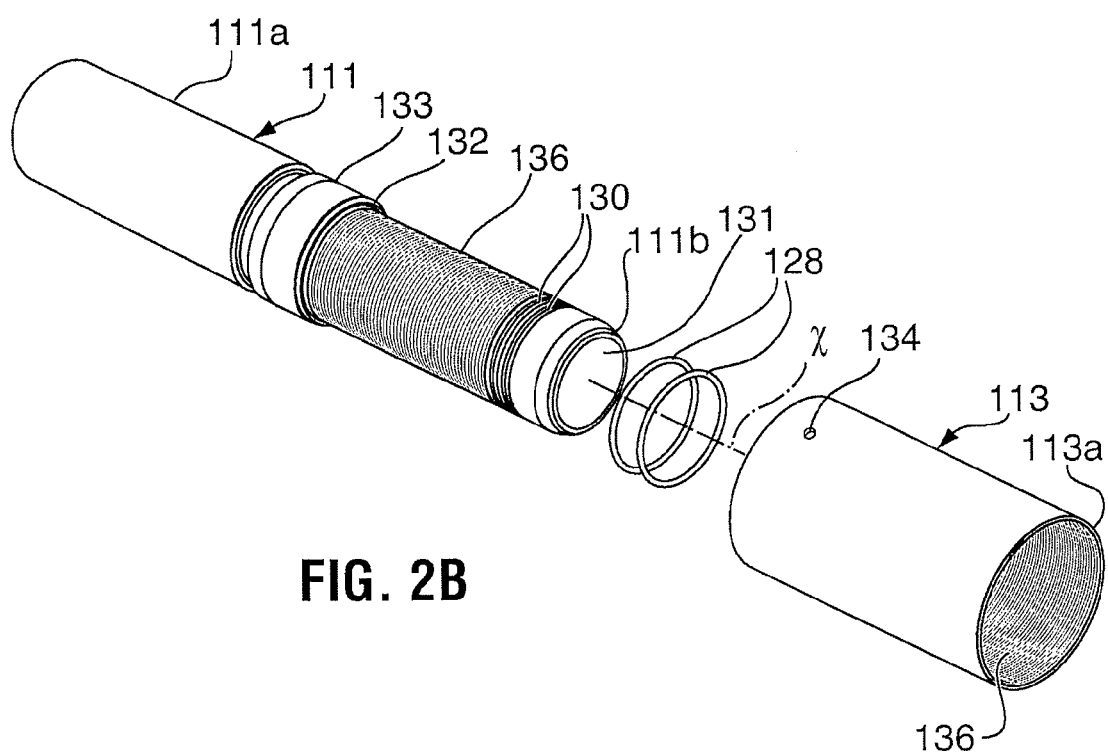
FIG. 2B is an exploded view of the pipe coupling of FIG. 2A

With reference to FIG. 2, it may be desirable to select a total length of an interval 121 to be crimped with consideration as to the pipe's pitch length Lp. A pitch length is defined as a cycle length, indicated as 124, of a spirally wound fiber reinforcement in a fiber reinforced pipe 110. In one embodiment of a connection, a length of the crimped interval 121 between the sleeve and the pipe, may be selected to be at least about 80% of the pitch length Lp or possibly at least about 100% of the pitch length of the reinforcing fiber wrap of the pipe.

A single or multiple step crimping process may be used if desired. In one embodiment for example, a first crimping step may be performed along a first length L1 of the sleeve, but not the full length L. Then a second crimping step may be performed having a length L2 that overlaps with the first length L1 crimped in the first step but also includes a portion of sleeve 113 not previously crimped. In such a two step crimping process, it may be desirable to crimp the first length L1 adjacent a connection 114 between sleeve 113 and mandrel 111 and then select the second crimped length L2 adjacent the open end 113*a* of the sleeve. Such a two step process may allow use of a smaller die set (i.e. of a reduced length) and reduce bubbling of residual materials. Of course, spaced apart crimps can also be used in a multi-step crimping process, if desired.

In some crimping processes of the present invention, it may be useful to hold crimping force for greater than 10 seconds. For example, once a selected maximum crimping force is achieved such force may be maintained for >10 seconds and possibly about 15 to 25 seconds. This may be set on the crimping device duration selector. Such a crimp hold force may be useful in colder weather operations where the ability of pipe materials to elastically deform may be reduced.

If desired, consideration may be given to the construction and materials of the sleeve and the mandrel in order to facilitate formation and function of a connection. For example, as with pipe 110, the materials of the mandrel and the sleeve may be selected with consideration as to the environment in which they are to operate, including the fluids to be conveyed through pipe 110 and in which the mandrel inner bore 131 and possibly the sleeve may come into contact.

Further, mandrel 111 may be formed to support the force of crimping thereover without crushing. Mandrel 111 may also be formed to facilitate and/or control the positioning of the other parts, as for example by inclusion of a pipe shoulder 132, which acts to stop insertion of pipe 110 and a sleeve positioning shoulder 133, which may be used to position and facilitate connection of sleeve 113.

The outer surface of mandrel 113 along length 113 may be formed to be substantially cylindrical and may have an outer diameter slightly less than the inner diameter of the pipe with which it is to be used, such that the pipe, when forced thereover is held snugly thereon and driven into a cylindrical form. In addition or alternately, inserted end 111*b* of mandrel 111, which is the end over which pipe 110 is forced, can be formed such that when sleeve is connected on the mandrel, inserted end 111b extends out beyond the sleeve. In one embodiment, for example, the mandrel and the sleeve are formed and configured such that the mandrel extends at least 0.5 and possibly 0.8 mandrel OD radii beyond end 113a of the sleeve. The mandrel may be gradually rounded and tapered at its inserted end 111b to facilitate installation of pipe 110 thereover. For example, this formation of inserted end 111b may cause the pipe to be brought to a circular condition before it enters annular space 116, which may permit the inner diameter of sleeve 113 to be reduced into close tolerance with the outer diameter of the pipe on the mandrel.

O-rings 128 or other sealing means may be installed between mandrel 111 and pipe 110 to seal against fluid flow therepast from the pipe, if desired. In the illustrated embodiment, for example, glands 130 may be formed near the end of mandrel to accept o-rings 128. If o-rings are used, they are installed before the mandrel is inserted into the pipe.

In one embodiment, sleeve 113 may include a hole 134 positioned to allow permeated gases trapped in the annulus 116 to vent. Hole 134 may be formed adjacent the end of sleeve that will be connected to mandrel and positioned so that therethrough the installation of pipe 110 can be observed to be at selected insertion depth.

Figure 3:
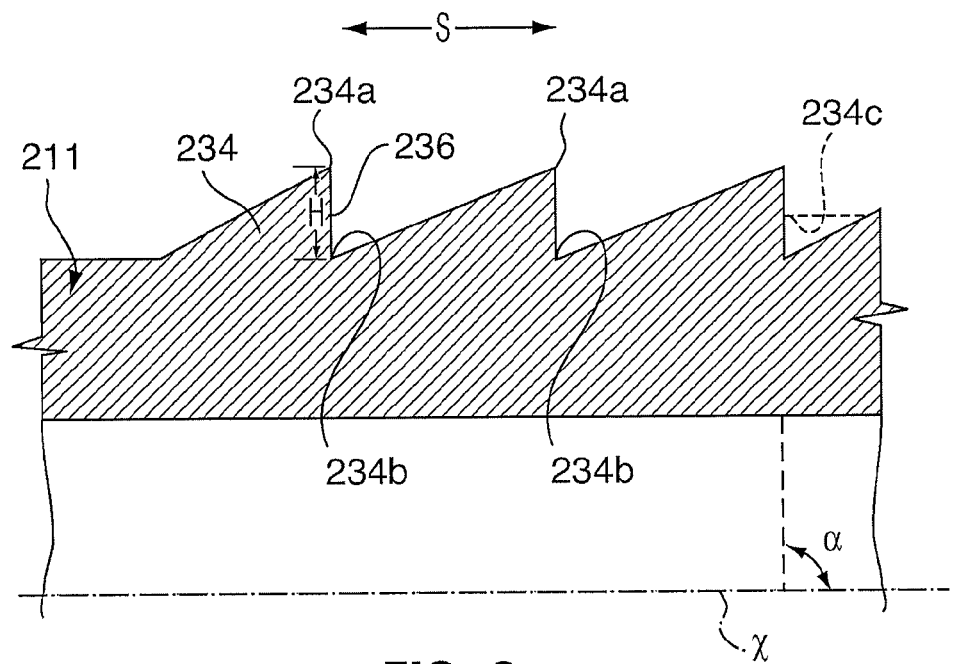
FIG. 3 is an enlarged view of a teethed mandrel surface useful in the present invention.

The inner surface of the sleeve and/or the outer surface along L of the mandrel may include teeth 136 thereon to facilitate gripping of the pipe therebetween. The teeth may be discreet, continuous circumferentially or spiraling. A non-spiral tooth form such as a circumferentially extending tooth may act against interface leakage. The teeth may be canted away from the inserted end of the mandrel to act against forces tending to pull the pipe out of the coupling. In one embodiment, the teeth may be formed to permit the material of the pipe to be forced into the valleys between adjacent teeth during crimping. In such an embodiment, with reference to FIG. 3, a tooth 234 is shown on a mandrel 211. Tooth 234 includes a rear tooth face 236 between a tooth crest 234a and tooth valley 234b that extends substantially without an overhang of the crest over the valley. For example, in the illustrated embodiment the rear tooth face 236 is cut substantially radially at about +/−5° from an orthogonal reference extending radially from the mandrel long axis x. Stated another way, the rear tooth face 236, which is the tooth face directed toward the mandrel outboard end and away from any forces tending to pull the pipe out of the connection, may extend at angle α of 85°-95° from the long axis x of the mandrel on which the tooth is fondled. The teeth formed on sleeve may also be formed to facilitate engagement of the material of the pipe.

In the illustrated embodiment, where a V-shaped valley is formed between the peaks of an adjacent pair of teeth, the teeth may be formed with 75 to 125 thousands (of an inch) spacings S (shown indicating crest to crest spacing) and a height H of 15 to 50 thousands (valley to crest). In another embodiment shown in phantom at 234c, the valley between adjacent teeth is flattened and although the spacing may remain generally similar to that previously described; the tooth height may be reduced to 0.010 to 0.050 inch. In one embodiment, spacing may be 90 to 110 thousands and tooth height maybe 20 to 40 thousands for discreet valleys or 10 to 20 thousands for a tooth arrangement with flat valleys.

A number of different coupling types may be provided according to the present invention and three possible types are shown. FIG. 1 shows a connection with a flanged fitting including a standard ANSI flange connection 17 and sleeve 13 connected to mandrel 11 through forming operation.

FIG. 2 shows outboard end 111a formed as a weld-neck fitting. In such a fitting, mandrel 111 may be formed of a non-polymeric material, such as metal and such a fitting-type may be used to connect a composite pipe 110 to a metallic pipe (not shown) by welding between outboard end 111a and the metallic pipe. FIG. 2 also shows sleeve 113 attached to mandrel 111 by welds 160, rather than by crimping.

Figure 4:
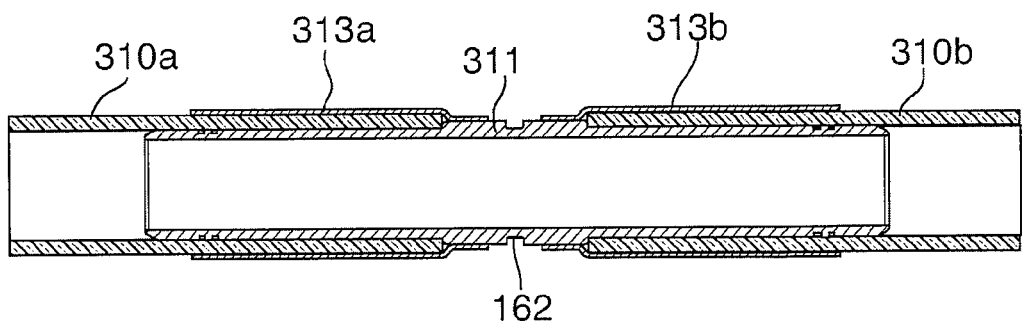
FIG. 4 is an axial sectional view of an end to end pipe coupling installed between two pipes.

An end to end fitting shown for example in FIG. 4, connects two pieces of pipe 310a, 310b together with or without a flange in between and includes a mandrel 311 with a sleeve 313a, 313b connectable on each of its ends. The mandrel of FIG. 4 may include a groove 162 on which a reusable split-ring tool is attached to facilitate mandrel handling for pipe installation and crimping operations.

Some possible benefits of the present connection of mandrel to sleeve may include: the press fit of the sleeve onto the mandrel may cause the sleeve to be well-centered on the mandrel improving fitting performance and reducing the size of the fitting; the compact size allows pre-assembly of standard ANSI flange; the sleeve can be removed from a used fitting so that mandrel can be reused; the coupling may provide increased axial retention capacity; the coupling arrangement may permit consistent axial location of sleeve relative to mandrel; and a low profile fitting adds very little to diameter of large diameter pipe. This provides a significant advantage for installation methods such as pulling through failed steel pipelines and plowing.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for installing a pipe coupling on a pipe comprising:

providing a pipe coupling including a mandrel and an outer sleeve; inserting the mandrel into the pipe inner diameter of an end of the pipe with an outboard end of the mandrel protruding from the end of the pipe; positioning the outer sleeve substantially concentrically outwardly of the pipe in which the mandrel is inserted to form a length of substantially concentrically arranged, overlapping portions of the mandrel, the pipe and the sleeve; crimping over a first portion of the length to engage the pipe between the sleeve and the mandrel; crimping over a second portion of the length, partially overlapping with the first portion, to further engage the pipe between the sleeve and the mandrel; and, either before or after crimping, connecting the sleeve to the outboard end of the mandrel, wherein the pipe is a fiber reinforced pipe having a pitch length and the crimping proceeds over a crimp length of at least 80% of the pitch length.

2. The method of claim 1 wherein the crimping proceeds using an array of crimping dies and crimping force is applied to the crimping dies to drive them against the sleeve such that the pressure applied at each die is substantially equal with each other die in the array.

3. The method of claim 2 wherein the crimping proceeds without consideration as to radial displacement of crimping dies.

4. The method of claim 1 wherein the sleeve is connected to the outboard end of the mandrel prior to inserting the mandrel into the pipe inner diameter.

5. The method of claim 1 wherein the sleeve is connected to the outboard end of the mandrel by forming the sleeve onto the mandrel.

6. The method of claim 1 wherein the sleeve is connected to the outboard end of the mandrel by welding the sleeve to the mandrel.

7. The method of claim 1, wherein during crimping, crimping pressure is maintained for 15 to 25 seconds.

8. The method of claim 1, wherein the first portion of the length is closer to the outboard end than the second portion of the length.

9. A method for installing a pipe coupling on a pipe comprising:
providing a pipe coupling including a mandrel and an outer sleeve; inserting the mandrel into the pipe inner diameter of an end of the pipe with an outboard end of the mandrel protruding from the end of the pipe; positioning the outer sleeve substantially concentrically outwardly of the pipe in which the mandrel is inserted to form a length of substantially concentrically arranged, overlapping portions of the mandrel, the pipe and the sleeve; crimping over at least a portion of the length to engage the pipe between the sleeve and the mandrel; and, either before or after crimping, connecting the sleeve to the outboard end of the mandrel, wherein the pipe is a fiber reinforced pipe having helically wrapped reinforcement fibers therein defining a pitch length and the crimping proceeds over a crimp length, defined axially along the pipe, of at least 80% of the pitch length.

10. The method of claim 9 wherein the crimping proceeds using an array of crimping dies and crimping force is applied to the crimping dies to drive them against the sleeve such that the pressure applied at each die is substantially equal with each other die in the array.

11. The method of claim 10 wherein the crimping proceeds without consideration as to radial displacement of crimping dies.

12. The method of claim 9 wherein the sleeve is connected to the outboard end of the mandrel prior to inserting the mandrel into the pipe inner diameter.

13. The method of claim 9 wherein the sleeve is connected to the outboard end of the mandrel by forming the sleeve onto the mandrel.

14. The method of claim 9 wherein the sleeve is connected to the outboard end of the mandrel by welding the sleeve to the mandrel.

15. The method of claim 9 further comprising after crimping, performing a second crimping step to further engage the pipe between the sleeve and the mandrel over a second portion of the length.

16. The method of claim 9, wherein during crimping, crimping pressure is maintained for 15 to 25 seconds.

* * * * *